(12) United States Patent
Lehoux et al.

(10) Patent No.: US 10,949,751 B2
(45) Date of Patent: Mar. 16, 2021

(54) OPTIMIZATION OF MULTIPLE CRITERIA IN JOURNEY PLANNING

(71) Applicant: Conduent Business Services, LLC, Dallas, TX (US)

(72) Inventors: Vassilissa Lehoux, Grenoble (FR); Luis Rafael Ulloa Paredes, London (GB)

(73) Assignee: Conduent Business Services LLC, Dallas, TX (US)

( * ) Notice: Subject to any disclaimer, the term of this patent is extended or adjusted under 35 U.S.C. 154(b) by 746 days.

(21) Appl. No.: 15/819,096

(22) Filed: Nov. 21, 2017

(65) Prior Publication Data
US 2019/0156218 A1 May 23, 2019

(51) Int. Cl.
*G06N 5/00* (2006.01)
*G01C 21/34* (2006.01)
*G06F 16/901* (2019.01)
*G06Q 10/04* (2012.01)
*G06Q 50/30* (2012.01)
*G06Q 10/06* (2012.01)

(52) U.S. Cl.
CPC ........... *G06N 5/003* (2013.01); *G01C 21/343* (2013.01); *G01C 21/3453* (2013.01); *G06F 16/9024* (2019.01); *G06Q 10/047* (2013.01); *G06Q 10/063* (2013.01); *G06Q 50/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,713,045 | B2* | 4/2014 | Bouchard | G06Q 10/0833 707/769 |
| 8,731,835 | B2* | 5/2014 | Chidlovskii | G08G 1/005 701/540 |
| 8,977,496 | B2* | 3/2015 | Ulloa Paredes | G06Q 50/30 701/533 |
| 9,400,680 | B2* | 7/2016 | Bouchard | G06N 7/005 |
| 9,404,760 | B2* | 8/2016 | Ulloa Paredes | G06Q 50/30 |

(Continued)

OTHER PUBLICATIONS

Barrett, et al., "Formal-language-constrained path problems," SIAM Journal on Computing, vol. 30(3), pp. 809-837 (2000).

(Continued)

*Primary Examiner* — Michael B Holmes
(74) *Attorney, Agent, or Firm* — Fay Sharpe LLP

(57) ABSTRACT

A computer-implemented system and method identify Pareto optimal candidate paths between an origin and a destination for which no other candidate path is strictly better on one of a predefined set of criteria and at least as good on all the others. A constraint is defined for each of the criteria, based on user input. A set of Pareto optimal candidate paths is identified, from an origin to a destination, which respect these constraints. The identification may include, in a search graph composed of nodes connected by edges, iteratively advancing each of a set of possible paths from an origin node by exactly one exit node and updating labels of the exit nodes reached. The exit node labels each include a value for each of the criteria. Labels of reached exit nodes that are dominated by another label of that reached node are removed. Pareto optimal candidate path(s) is/are identified.

20 Claims, 10 Drawing Sheets

(56) References Cited

U.S. PATENT DOCUMENTS

| | | | |
|---|---|---|---|
| 9,715,695 B2* | 7/2017 | de Souza | G06Q 30/0202 |
| 10,019,671 B2* | 7/2018 | Ulloa Paredes | G06N 5/02 |
| 10,089,640 B2* | 10/2018 | de Souza | G06Q 30/0201 |
| 2013/0185324 A1 | 7/2013 | Bouchard et al. | |
| 2013/0317742 A1 | 11/2013 | Chidlovskii et al. | |
| 2013/0317747 A1 | 11/2013 | Chidlovskii et al. | |
| 2013/0317884 A1 | 11/2013 | Chidlovskii et al. | |
| 2014/0089036 A1 | 3/2014 | Chidlovskii et al. | |
| 2014/0288982 A1 | 9/2014 | Chidlovskii et al. | |
| 2015/0186792 A1 | 7/2015 | Chidlovskii et al. | |
| 2016/0033283 A1 | 2/2016 | Ulloa Paredes et al. | |
| 2016/0123748 A1 | 5/2016 | Chidlovskii | |
| 2016/0364645 A1 | 12/2016 | Ulloa Paredes et al. | |
| 2017/0053209 A1 | 2/2017 | Ceret et al. | |
| 2017/0109764 A1 | 4/2017 | Tripathy et al. | |
| 2017/0132544 A1 | 5/2017 | Michel et al. | |
| 2017/0169373 A1 | 6/2017 | Roulland et al. | |
| 2017/0206201 A1 | 7/2017 | Chidlovskii | |

OTHER PUBLICATIONS

Chen, et al., "Bicriterion shortest path problem with a general non-additive cost," 20th International Symposium on Transportation and Traffic Theory, Procedia—Social and Behavioral Sciences vol. 80, pp. 553-575 (2013).

Kluge, et al., New complexity results for time-constrained dynamical optimal path problems. Journal of Graph Algorithms and Applications, vol. 14(2), pp. 123-147 (2010).

Hansen, "Bicriterion path problems," In Günter Fandel and Tomas Gal, Proc. Third Conference Hagen/K onigswinter, West Germany, Aug. 20-24, 1979, vol. 177 of Lecture Notes in Economics and Mathematical Systems, pp. 109-127 (1980).

Moungla, "An improving dynamic programming algorithm to solve the shortest path problem with time windows," Electronic Notes in Discrete Mathematics, vol. 36, pp. 931-938 (2010).

Mouratidis, et al., "Preference queries in large multi-cost transportation networks," 2010 IEEE 26th Int'l Conf. on Data Engineering (ICDE 2010) pp. 533-544 (2010).

Soo, et al., "Recommending a trip plan by negotiation with a software travel agent," International Workshop on Cooperative Information Agents pp. 32-37 (2001).

Yang, et al., "Finding the cost-optimal path with time constraint over time-dependent graphs," Proc. VLDB Endowment, vol. 7, pp. 673-684 (2014).

* cited by examiner

OPTIMIZATION OF MULTIPLE CRITERIA IN JOURNEY PLANNING

BACKGROUND

The exemplary embodiment relates to journey planning and finds particular application in a system and method for assisting a user in selecting an optimal route for a journey which considers multiple criteria.

When traveling long distances by road, toll costs can be a significant part of the travel expense. While in some cases, toll costs are roughly proportional to the distance traveled on the toll-paying roads, in others, more complex rules are applied. For example, tolls can be dependent on the entry and exit points in a non-proportional way. In this case, a user traveling from A to B may pay less in tolls overall by exiting the tollway at one point on the route and reentering shortly thereafter, sometimes at the same tollbooth location. This approach ignores the inconvenience of leaving and returning to the tollway and potential increase in the time of the journey, due to queuing at the tollbooths, distances traveled at lower speed, and so forth. The driver may be willing to arrive later to reduce the costs, if the delay is not too great, but many drivers would be unwilling to accept large increases in travel time, even if there are no toll costs for the alternative journey. Thus, there may be multiple criteria which could be considered in identifying an optimal solution for a particular user. Some of these may involve hard constraints, such as an arrival time deadline, while others may entail user preferences, such as a preference for minimizing toll costs.

One application has been developed to propose possible points where the driver can exit and immediately reenter the toll road in order to reduce the total toll cost (see, e.g., Autoroute-€co at http://www.autoroute-eco.fr/). However, such an application does not consider the effect on other criteria which may be relevant to the user and also requires the user to choose an itinerary before the exit/entry points are proposed.

There remains a need for a system and method for computing a set of itineraries for a user which use different trade-offs between criteria, such as arrival time, toll cost, and convenience, which respect the user's constraints, such as the journey arrival time or the maximum number of toll crossings (where a user enters and exits a tollbooth on a toll road and incurs a toll).

INCORPORATION BY REFERENCE

The following references, the disclosures of which are incorporated herein by reference in their entireties, are mentioned:

U.S. Pub. No. 20170206201, published Jul. 20, 2017, entitled SMOOTHED DYNAMIC MODELING OF USER TRAVELING PREFERENCES IN A PUBLIC TRANSPORTATION SYSTEM, by Boris Chidlovskii.

U.S. Pub. No. 20170169373, published Jun. 15, 2017, entitled SYSTEM AND METHOD FOR MEASURING PERCEIVED IMPACT OF SCHEDULE DEVIATION IN PUBLIC TRANSPORT, by Frederic Roulland, et al.

U.S. Pub. No. 20170132544, published May 11, 2017, entitled METHOD AND SYSTEM FOR STOCHASTIC OPTIMIZATION OF PUBLIC TRANSPORT SCHEDULES, by Sofia Zaourar Michel, et al.

U.S. Pub. No. 20170109764, published Apr. 20, 2017, entitled SYSTEM AND METHOD FOR MOBILITY DEMAND MODELING USING GEOGRAPHICAL DATA, by Abhishek Tripathi, et al.

U.S. Pub. No. 20170053209, published Feb. 23, 2017, entitled SYSTEM AND METHOD FOR MULTI-FACTORED-BASED RANKING OF TRIPS, by Eric Ceret, et al.

U.S. Pub. No. 20160364645, published Dec. 15, 2016, entitled LEARNING MOBILITY USER CHOICE AND DEMAND MODELS FROM PUBLIC TRANSPORT FARE COLLECTION DATA, by Luis Rafael Ulloa Paredes, et al.

U.S. Pub. No. 20160123748, published May 5, 2016, entitled TRIP RERANKING FOR A JOURNEY PLANNER, by Boris Chidlovskii.

U.S. Pub. No. 20160033283, published Feb. 4, 2016, entitled EFFICIENT ROUTE PLANNING IN PUBLIC TRANSPORTATION NETWORKS, by Luis Rafael Ulloa Paredes.

U.S. Pub. No. 20150186792, published Jul. 2, 2015, entitled SYSTEM AND METHOD FOR MULTI-TASK LEARNING FOR PREDICTION OF DEMAND ON A SYSTEM, by Boris Chidlovskii.

U.S. Pub. No. 20140288982, published Sep. 25, 2014, entitled TEMPORAL SERIES ALIGNMENT FOR MATCHING REAL TRIPS TO SCHEDULES IN PUBLIC TRANSPORTATION SYSTEMS, by Boris Chidlovskii.

U.S. Pub. No. 20140089036, published Mar. 27, 2014 DYNAMIC CITY ZONING FOR UNDERSTANDING PASSENGER TRAVEL DEMAND, by Boris Chidlovskii.

U.S. Pub. No. 20130317884, published Nov. 28, 2013, entitled SYSTEM AND METHOD FOR ESTIMATING A DYNAMIC ORIGIN-DESTINATION MATRIX, by Boris Chidlovskii.

U.S. Pub. No. 20130317747, published Nov. 28, 2013, entitled SYSTEM AND METHOD FOR TRIP PLAN CROWDSOURCING USING AUTOMATIC FARE COLLECTION DATA, by Boris Chidlovskii, et al.

U.S. Pub. No. 20130317742, published Nov. 28, 2013, entitled SYSTEM AND METHOD FOR ESTIMATING ORIGINS AND DESTINATIONS FROM IDENTIFIED END-POINT TIME-LOCATION STAMPS, by Boris Chidlovskii.

U.S. Pub. No. 20130185324, published Jul. 18, 2013, entitled LOCATION-TYPE TAGGING USING COLLECTED TRAVELER DATA, by Guillaume M. Bouchard, et al.

BRIEF DESCRIPTION

In accordance with one aspect of the exemplary embodiment, a method for identifying candidate paths between an origin and a destination is provided. The method includes establishing a constraint for each of a plurality of criteria, based on input from a user. A set of Pareto optimal candidate paths from the origin to the destination, which respect the constraints on the criteria and which are all Pareto optimal is computed. At least a subset of the Pareto optimal candidate paths is displayed to the user.

At least one of establishing constraints, computing the set of candidate paths, and displaying at least a subset of the Pareto optimal candidate paths may be performed with a processor.

In accordance with another aspect of the exemplary embodiment, a system for identifying candidate paths between an origin and a destination includes memory which stores a network graph in which tollbooths are represented by nodes of the graph, the nodes being connected by edges, each edge being associated with a respective duration. A criteria setting component establishes a constraint for each of a plurality of criteria, based on input from a user. A candidate path computation component computes a set of Pareto optimal candidate paths from the origin to the destination, based on the network graph, which respect the constraints on the criteria and which are all Pareto optimal. A display component causes at least a subset of the Pareto optimal candidate paths to be displayed to the user. A processor implements the criteria setting component, the candidate path computation component and display component.

In accordance with another aspect of the exemplary embodiment, a method for identifying candidate paths between an origin and a destination is provided. The method includes receiving information from a user for identifying an origin and a destination in a road network which includes a toll road network. A shortest duration path from the origin to the destination is identified. Provision is made for the user to input constraints on three criteria, at least one of the criteria being a maximum duration on a candidate path from the origin to the destination which is at least the duration of the shortest duration path. A set of Pareto optimal candidate paths from the origin to the destination is identified. This includes providing a search graph modeling a part of the road network between the origin and destination, in which toll network entries and exits and intermediate tollbooths between the entries and exits are represented as nodes connected by edges, each edge being associated with a duration. Nodes of the search graph are pruned. The pruned nodes are each a node for which no path from the origin to the destination containing it can satisfy the maximum arrival time constraint. From the pruned search graph, a set of Pareto optimal candidate paths from the origin to the destination, which respect the constraints on the criteria and which are all Pareto optimal, is identified. At least a subset of the Pareto optimal candidate paths is displayed to the user.

At least one of the generating of the candidate set of paths and displaying at least the subset of the candidate paths may be performed with a processor.

DETAILED DESCRIPTION

A system and method are described which provide for identifying and outputting a set of Pareto optimal candidate paths from an origin to a destination, which obey constraints on each of a set of criteria. The exemplary paths are paths in a road network represented by a network graph.

In a multi-objective optimization setting, such as the problem here where multiple criteria are to be optimized, a Pareto optimal solution (in this case, an identified path) is such that no other solution is strictly better on one of the criteria and at least as good on the others. A Pareto set thus contains all the possible compromise solutions between the criteria (three criteria in the exemplary embodiment).

As used herein, a "road network" is considered to include toll roads of one or more toll networks and non-toll roads, on which vehicles are able to travel. A road network, or part thereof, can be modeled as a "network graph" in which candidate paths between an origin and a destination can be identified. The network graph includes a set of nodes connected by labeled edges, the edges representing path segments that use the toll network(s), some of the nodes represent entry and exit tollbooths that may be connected to others of the nodes by arcs representing path segments which use non-toll roads, others of the nodes represent tollbooths that are intermediate entry and exit tollbooths, where a vehicle is not required to enter or exit the toll network.

Figure 1:
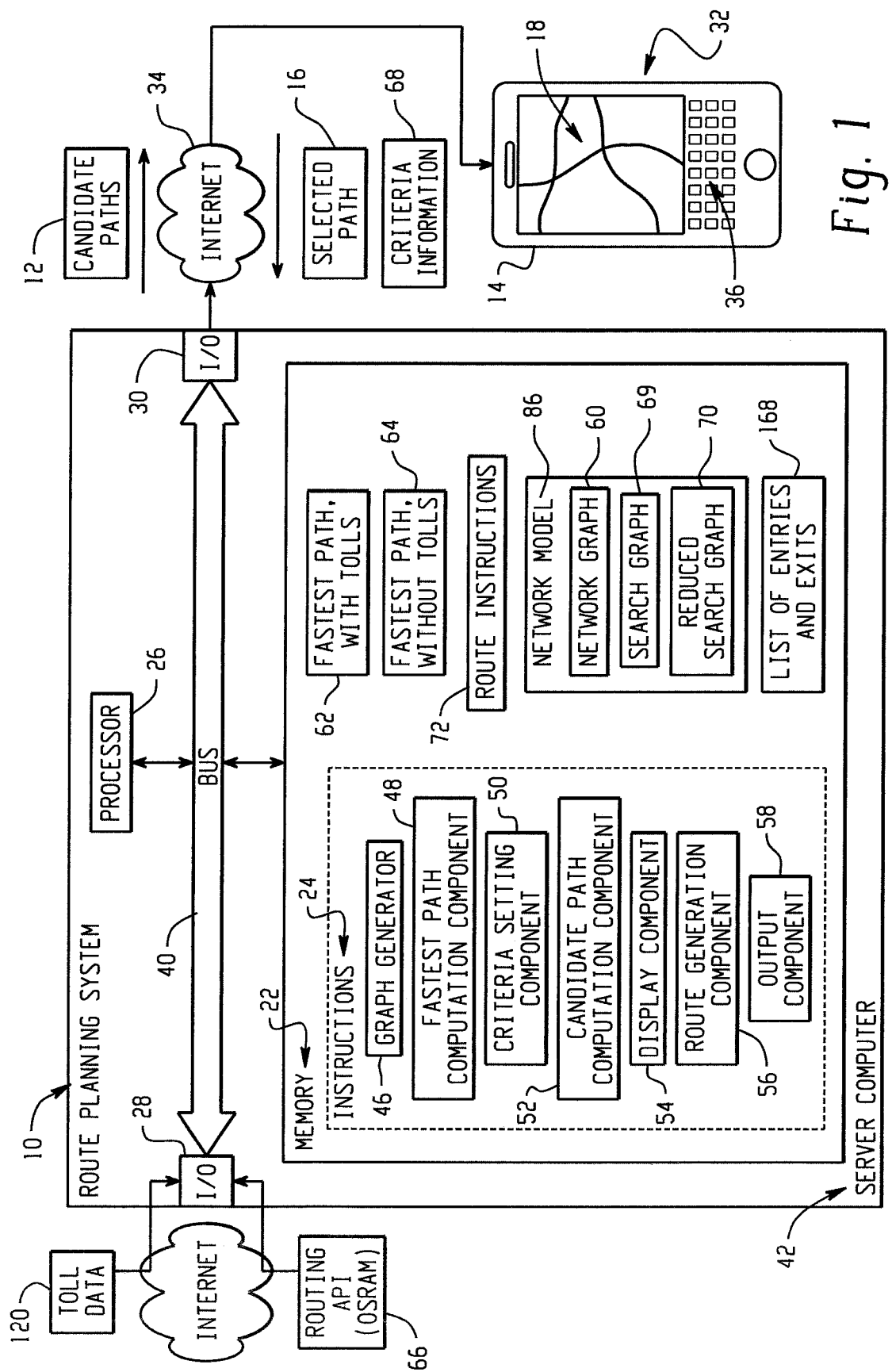
FIG. 1 is a functional block diagram of a system for generating itineraries for a proposed route in accordance with one aspect of the exemplary embodiment.

With reference to FIG. 1, a route planning system 10 computes a set of candidate paths (routes) 12 for a user's proposed journey from an origin to a destination. Some of the candidate paths may use a toll road network and may therefore include one or more toll crossings. A toll crossing occurs when a user passes through a tollbooth on the toll road network, incurring payment of a toll. Tollbooths where no payment is incurred, e.g., when a user enters the toll network and simply collects a ticket, are not counted as toll crossings.

The candidate paths 12, or a subset thereof, can be displayed to a user on an integral or associated display device 14. The candidate paths may be graphically displayed to the user, e.g., on a map 18 (see, e.g., FIG. 3). The user is able to select a path 16 from the set of candidate paths 12.

The candidate paths 12 are generated to provide different "optimal" trade-offs, given a set of at least two or at least three criteria 20. Exemplary criteria may include arrival time, total toll cost, and toll crossings. While three criteria are exemplified, there may be fewer, more, or different criteria considered. By "optimal," it is meant that the candidate paths 12 are Pareto optimal, as defined below.

The system 10 includes memory 22, which stores instructions 24 for performing the exemplary method and a processor 26, in communication with the memory for executing the instructions. In particular, the processor 26 executes instructions for performing at least a part or all of the method outlined in FIG. 2. The processor may also control the overall operation of the computer system 10 by execution of processing instructions which are stored in memory 22. Computer system 10 also includes one or input/output interfaces 28, 30. The I/O interface 30 may communicate with a client device 32 via a link 32, such as a wired or wireless network, such as the Internet. The client device 32, in this embodiment, includes the display device 14, for displaying information to users, and a user input device 36, for inputting text and for communicating user input information and command selections to the processor, such as constraints, e.g., bounding value(s), for one or more selected criteria 20. In the three example criteria, the constraints may all be upper bounds. The user input device 36 may include one or more of a keyboard, keypad, touch screen, writable screen, and a cursor control device, such as mouse, trackball, or the like. In other embodiments, the display device 14 and user input device 36 may be directly connected to the system. The various hardware components 22, 26, 28, 30 of the computer 10 may be all connected by a bus 40. The system may be hosted by one or more computing devices, such as the illustrated server computer 42.

The computer system 10 may include one or more of a PC, such as a desktop, a laptop, palmtop computer, portable digital assistant (PDA), server computer, cellular telephone, tablet computer, pager, combination thereof, or other computing device capable of executing instructions for performing the exemplary method.

The memory 22 may represent any type of non-transitory computer readable medium such as random access memory (RAM), read only memory (ROM), magnetic disk or tape, optical disk, flash memory, or holographic memory. In one embodiment, the memory 22 comprises a combination of random access memory and read only memory. In some embodiments, the processor 26 and memory 22 may be combined in a single chip. The input/output (I/O) interface 28, 30 allow(s) the computer to communicate with other devices via a computer network, such as a local area network (LAN) or wide area network (WAN), or the internet, and may comprise a modulator/demodulator (MODEM) a router, a cable, and and/or Ethernet port. Memory 22 stores instructions for performing the exemplary method as well as the processed data, such as set of candidate paths 12 and boundary values for selected criteria 20.

The digital processor 26 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The software instructions 24 may include various components for implementing parts of the method. Some or all of the software components may be wholly or partly resident on the client device. For example, as illustrated in FIG. 1, the instructions 24 include a graph generator 46, a fastest path computation component 48, a criteria setting component 50, a candidate path computation component 52, a display component 54, a route generation component 56, and an output component 58.

Briefly, in a preprocessing phase, the graph generator 46 generates a network graph 60, which models a road network, the network graph 60 representing paths between entry and exit tollbooths in a toll road network (or networks) and connections between exit and entry tollbooths in a toll-free part of the road network. In order to construct the network graph 60, the graph generator calls on the fastest path computation (FCP) component 48, which for each entering tollbooth and each reachable exit tollbooth in the toll network computes a fastest path (shortest duration) between the two through the toll road network. The FCP component 48 also computes, for each exit tollbooth and each reachable entering tollbooth in the toll network, a fastest path between the two in the toll-free part of the road network, i.e., excluding toll roads. The network graph 60 is stored in memory.

The FCP 48 component is also configured for receiving, as input, an origin s and a destination t, selected by a user, for an as yet unspecified path. The origin and destination may each be a place name, address, GPS location, or other information from which its map coordinates can be identified. Given the origin and destination, the FCP component uses the network graph 60 to identify first and second paths 62, 64 between the origin and destination. The first path 62 is a shortest duration path which can use toll roads, if they will lead to a faster overall journey time. The second path 64 is a shortest duration path without use of toll roads. At query time, the network graph 60 is adapted to include the origin and destination as points on the graph, with connections to the toll network.

The FPC component 48 may include or have access to a routing application 66, such as the Open Source Routing Machine (OSRM), which, uses information on connections between points on a map, and information about posted speed limits, turn restrictions, and so forth, to predict a fastest route (shortest duration). The routing application 66 need not consider all possible routes, particularly in the non-toll part of the road network. Precomputed journey times between pairs of points can be summed to generate a total journey time for a given path. The routing application 66 is adapted to the present method to allow for generation of candidate paths which are required to be toll-free paths and candidate paths which can use toll roads. At query time, the routing application 66 may be used to compute journey times from the origin to the toll road network and from the toll road network to the destination.

The criteria setting component 50 allows a user to provide criteria information 68, such as a bounding value for one or more of a predefined set of criteria or to provide information from which the criteria setting component 50 determines the bounding value(s) for a proposed journey. The criteria setting component may ask the user which of the criteria the user would like to define and generate a graphical user interface which allows the user to select bounding values for those criteria. In the case of the arrival time criterion, the user may input a value of a latest arrival time (maximum journey time), or information from which it can be determined such as, a maximum excess arrival time (the difference between the predicted arrival time of the fastest path and that of a candidate path), or the like. In the case of the total toll cost criterion, the user may input a maximum amount to be spent on tolls, which may be zero or non-zero, e.g., selected from a set or range of possible amounts. In the case of the toll crossings criterion, the user may enter a maximum number of toll crossings, which may be zero or non-zero, e.g., selected from a set of possible numbers. The criteria setting component thus provides, for each criterion, for the user to select from a range of possible criteria boundary values. In one embodiment, the criteria setting component may require the user to (or by default) select a value for at least one of, or at least two of, the criteria, which enables the system to consider paths other than the fastest path in identifying Pareto optimal paths. Because toll costs do not correlate with toll crossings in an exactly linear increasing relation, having these as separate criteria allows users to decide which of these criteria are most relevant to them. For example, on some road networks, higher toll costs are associated with fewer tollbooths.

The candidate path computation component 52 uses the coordinates of the user-selected origin and destination and computes a set 12 of candidate paths, which meet the bounding values set for the criteria and which are Pareto optimal. If the user has not provided a bounding value for one or more of the criteria, the itinerary computation component may use a default value corresponding to that of the first path 62, or other predetermined default value. The candidate path computation component 52 may generate a search graph 69 from the network graph 60, and prune the search graph to identify a reduced search graph 70. From the search graph 69 or 70, component 52 identifies a set 12 of the possible paths through the search graph between the origin and the destination that meet the bounding values set for the criteria and which are Pareto optimal.

The display component 54 generates a graphical display of at least some of the Pareto optimal candidate paths 12, e.g., on the map 18, together with path labels providing information on the values of each of the set of criteria.

The route generation component 56 receives, as input, a user selection of one of the candidate paths 12 and generates route instructions 72 for the selected path.

The output component 58 outputs information to the client device, such as information for generating a map displaying the candidate paths 12 and route instructions 72 for the selected path.

Figure 2:
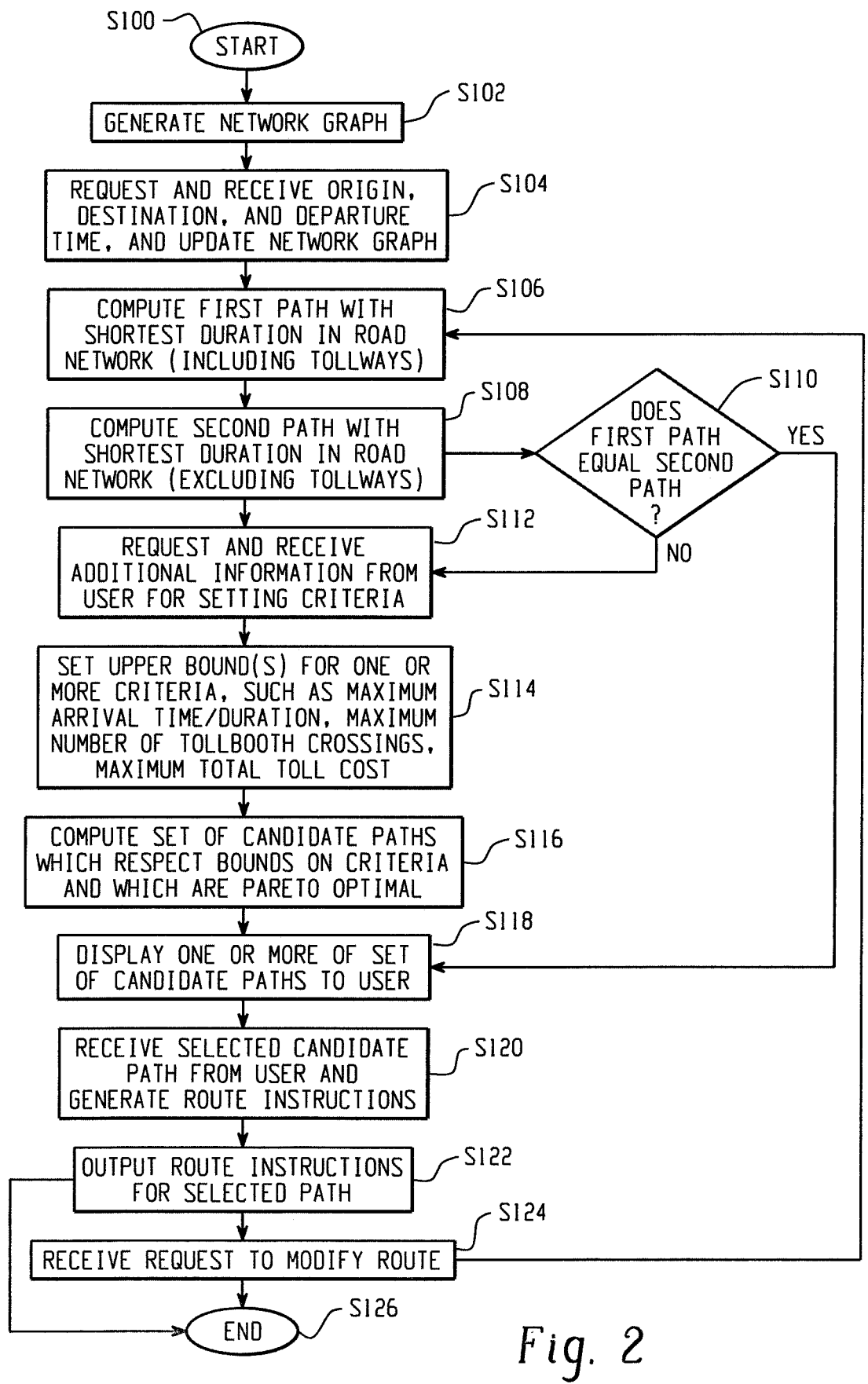
FIG. 2 is a flow chart illustrating a method for generating itineraries for a proposed route in accordance with another aspect of the exemplary embodiment.

With reference now to FIG. 2, a route planning method which may be performed with the system of FIG. 1 is illustrated. The method begins at S100.

Figure 4:
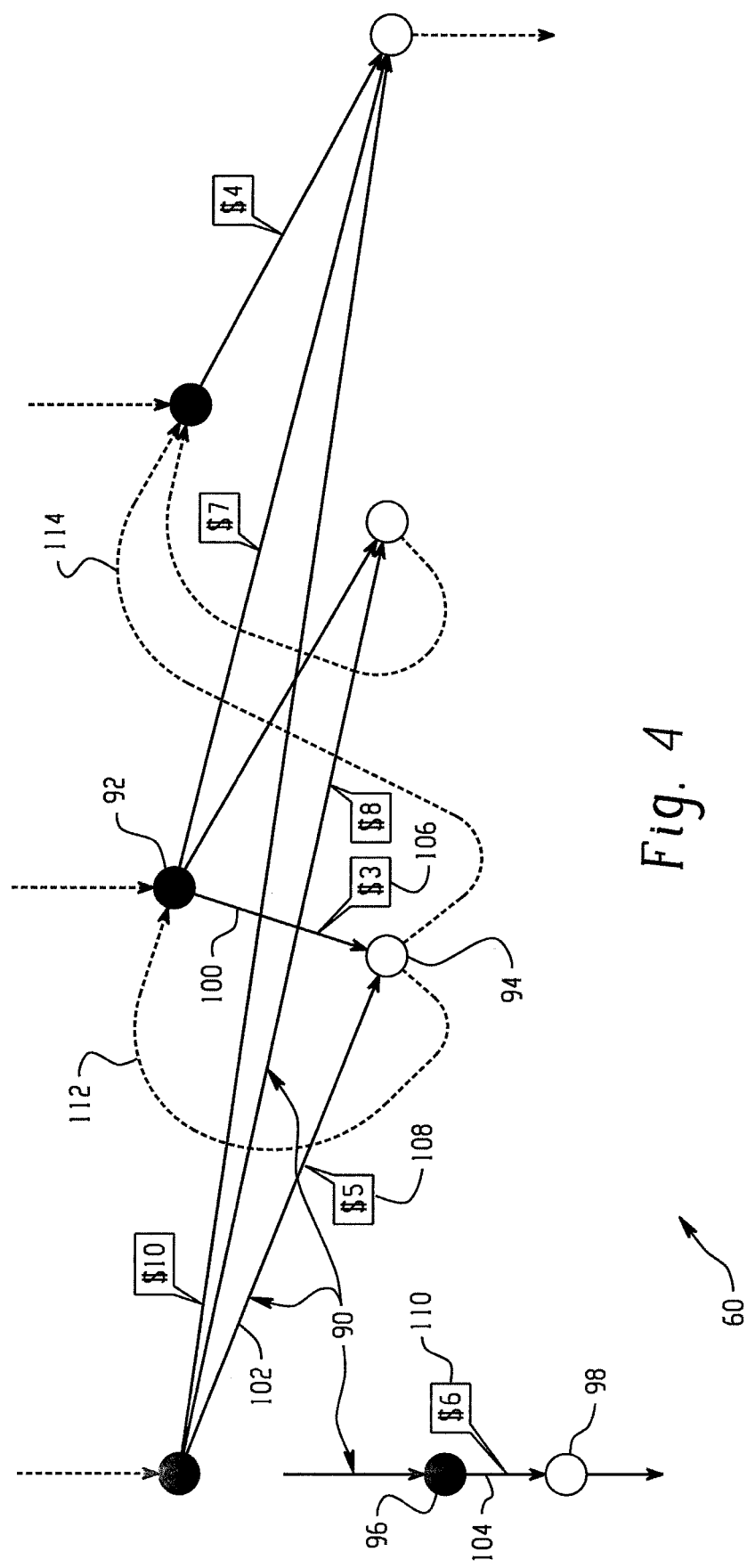
FIG. 4 is a graph representing part of a road network which includes a toll road network.

At S102, in a preprocessing step, a network graph 60 is generated (or otherwise provided). A part of an example network graph 60 for a geographical area is illustrated in FIG. 4.

Figure 6:
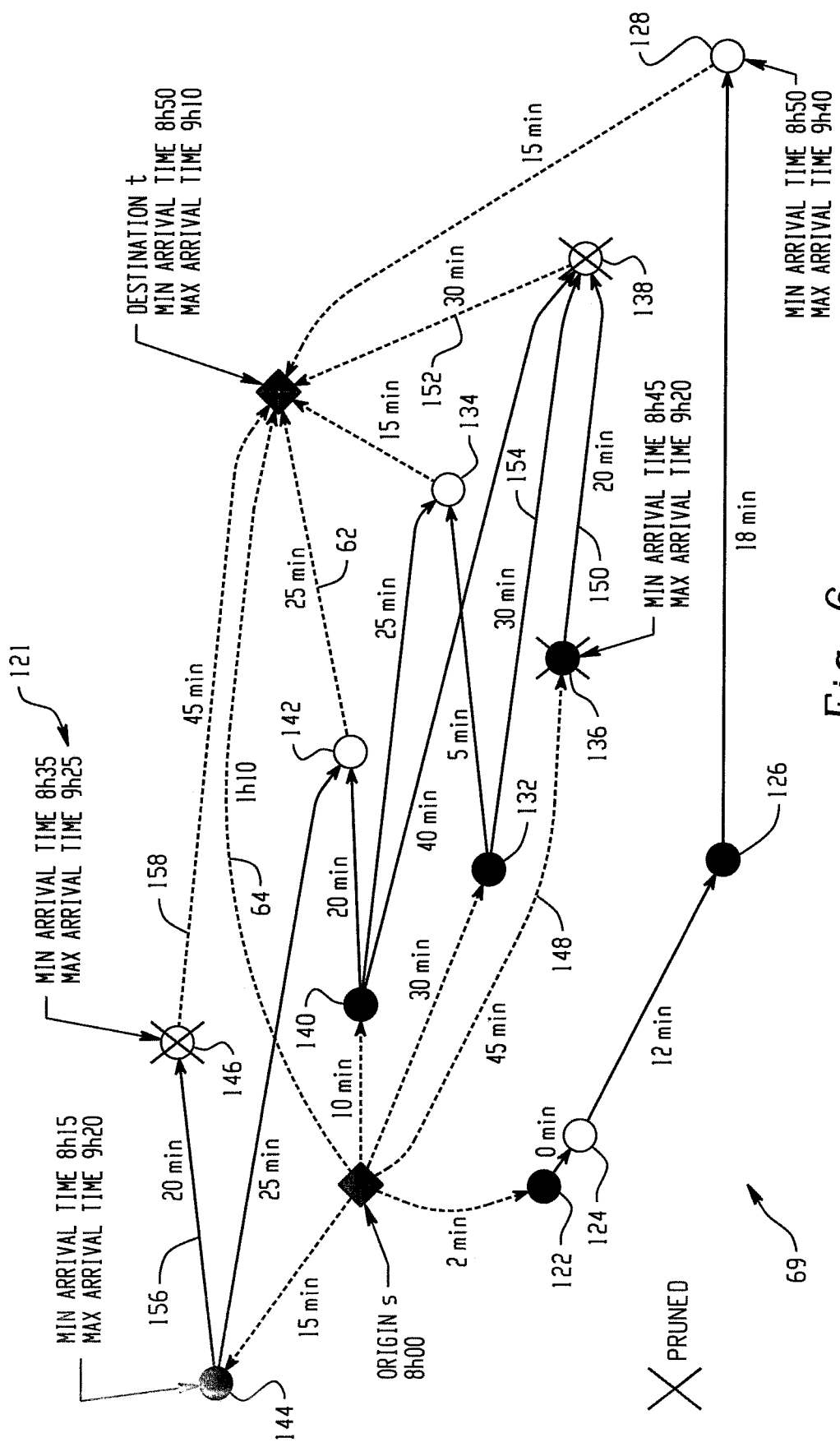
FIG. 6 graphically illustrates pruning of a search graph, based on one or more constraints.

At S104, a user may initialize an application on the client device 32, which establishes a link with the system 10. The system requests an origin (starting point), destination (end point), and departure time from the user and receives the information from the user or information from which the origin, destination, and departure time can be computed. A search graph 69 is generated which includes the origin and destination and at least a part of the network graph 60. In particular, the network graph 60, covering the geographical area which includes the origin and destination, is adapted to include the origin and destination and connections from the origin and destination to the toll road network(s). An example search graph 69 is shown in FIG. 6.

At S106, a first path 62, with the shortest duration in the road network, including tollways, is computed, given the chosen start time, e.g., with the fastest path computation component 48 using the network graph 60 or search graph 69.

At S108, a second path 64, with shortest duration in the same road network, but excluding tollways, is computed, e.g., with the fastest path computation component 48, using the search graph 69.

In some cases, the second path 64 may be the same as the first path 62, for example, where there are no convenient paths employing toll roads. Accordingly, the method may include a check at S110. If the second path equals the first path (or the first path has no toll roads), the method may proceed to S118, otherwise, to S112.

At S112, criteria information 68 is requested from the user for setting the criteria, and is received, e.g., by the criteria setting component 50.

At S114 upper bound(s) for one or more of the criteria 20, such as at least two or at least three criteria, are set, such as a maximum arrival time/duration, a maximum number of toll crossings, and/or a maximum total toll cost, e.g., by the criteria setting component 50, based on the information received at S112.

At S116, a set of Pareto optimal paths 12 is identified, e.g., by the candidate path computation component 52. Each path in the set of Pareto optimal paths 12 is a Pareto optimal path which meets the upper bounds of each of the criteria. Step S116 may include pruning the search graph 69 resulting in a search space 70 for the given origin and destination. Paths 12 in the search space that are Pareto optimal are identified. The identification of the Pareto optimal paths 12 may include iteratively advancing each of a set of possible paths from the origin node in the search graph 69 by exactly one exit node and updating labels of each of the exit nodes reached. The exit node labels each include a value for each of the criteria. Labels of the reached nodes that are dominated by another label of that reached exit node are removed and are not considered in updating the labels of the reached exit nodes in each subsequent iteration. This has the effect of removing some of the possible paths from further consideration. Further details on this step are described below, with reference to FIG. 5.

At S118, one or more of the set of Pareto optimal candidate paths 12 is/are identified (e.g., displayed) to the user, e.g., by the display component 54, e.g., on a map 18.

At S120, a selected path 16, selected from the candidate paths, is received from the user, and route instructions 72 for the selected path are generated, e.g., by the route generation component 56.

At S122 the route instructions 72 are output, e.g., by the output component 56. These may be out put visually, e.g., displayed to a user on the display device, output aurally, e.g., by an audio device, such as a microphone, or a combination thereof.

While following the route, the user may wish to modify the route and input a request to modify (S124), which is received by the system. The method may return to S106, S108, where the path(s) with shortest duration in the road network, with and without tollways, from the user's current location, are computed, and the user may be provided with an opportunity to modify the bounds for the criteria at S112.

The method ends at S126.

Figure 3:
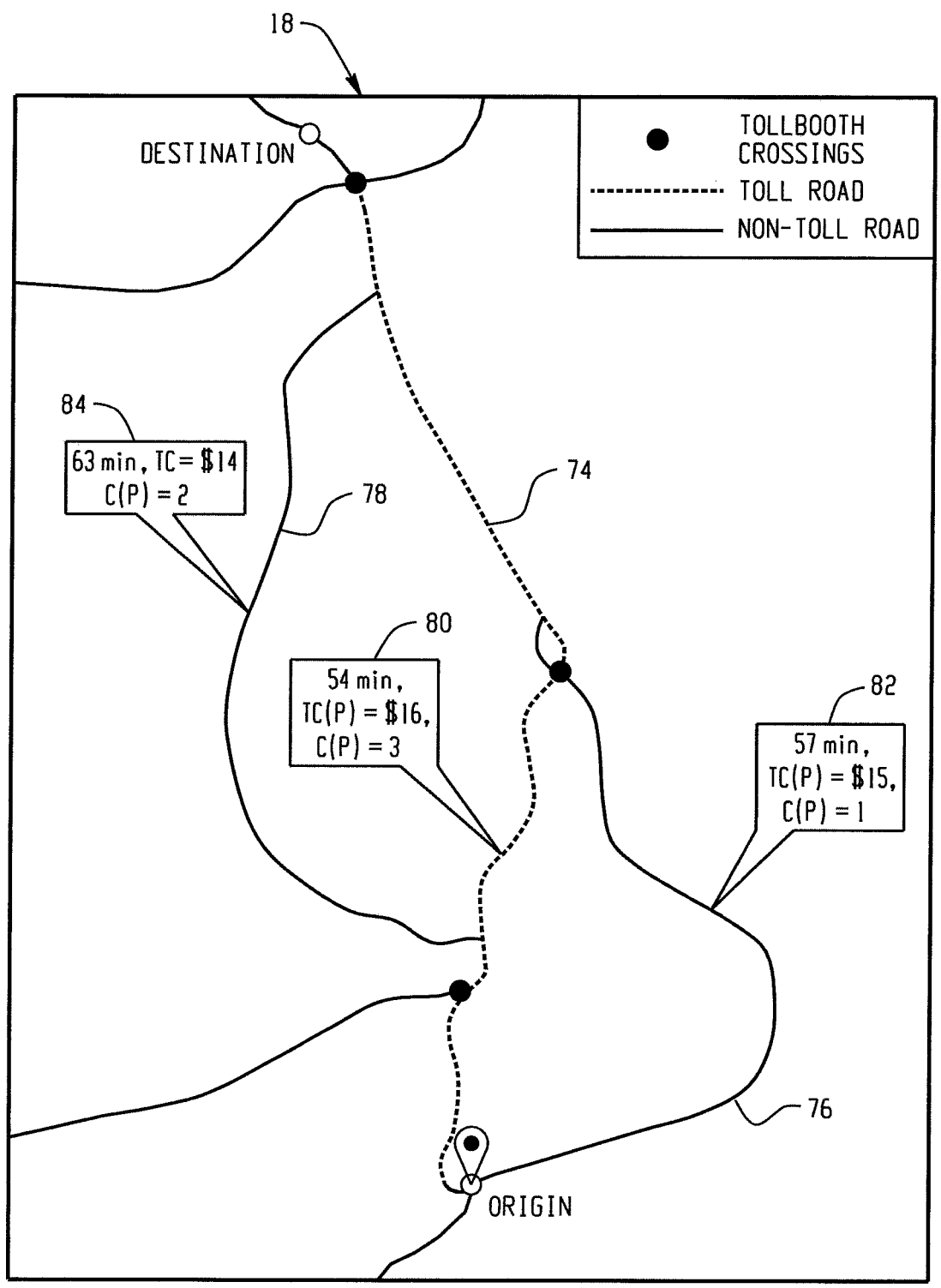
FIG. 3 illustrates a map identifying a set of paths that are Pareto optimal.

With reference now to FIG. 3, the set of Pareto optimal candidate paths 12 may be graphically displayed (S118) on the map 18, where each path is displayed as a respective visually recognizable route 74, 76, 78 from the origin to the destination. The different characteristics of the paths (including duration, toll cost, and number of toll crossings) are listed in respective path labels 80, 82, 84 to assist the user in selecting a route.

To generate a relevant set of Pareto optimal candidate paths 12 (S116), the path computation component 52 computes all the solutions of the Pareto set for the 1-to-1 shortest path problem with the predefined criteria (e.g., the arrival time of the path, the total toll cost of the path, and/or the number of toll crossings during the path).

The general problem of multi-criteria shortest paths is NP-hard, even for two criteria: such as minimum arrival time and minimum toll cost, which are of type min sum, min sum, and for some graphs, the number of Pareto optimal paths can be exponential. See, Pierre Hansen, "Bicriterion path problems," Lecture Notes in Economics and Mathematical Systems, vol. 177, pp. 109-127, 1980. Optimizing only one of the criteria, such as finding the minimum cost path, or the path with the minimum number of toll crossings is a much simpler problem, but it provides only one solution, rather than a complete Pareto set.

In order to generate a relevant path set 12, the exemplary method computes all the solutions of the Pareto set for the 1-to-1 shortest path problem with three criteria:

1) Minimizing the arrival time of a 1-to-1 path P, denoted arrival_time(P), or simply AT(P).

2) Minimizing the total toll cost of a 1-to-1 path P, denoted toll_cost(P), or simply TC(P).

3) Minimizing the number of toll crossings during a 1-to-1 path P, denoted crossings(P) or simply C(P).

In such a multi-objective optimization setting, a Pareto optimal solution (also known as a Pareto efficient solution) is such that it is not dominated by another solution. A solution S is dominated if there exists another solution for which all the objective values of each criterion are at least as good as the ones of S and strictly better for at least one criterion. This implies that when considering a solution of the Pareto set, none of the criteria can be improved without degrading some of the other criteria. In the exemplary system and method, the criteria include a criterion which will increase by 1 on some edges (as in the case of the number of toll crossings) and min-sum, min-sum for the two other criteria.

The Pareto set hence contains compromise solutions between the three criteria. The system 10 can then propose to the user one, several or all of those solutions 12 through an interface, such as interface 14.

Further details of the system and method will now be provided.

In step S106, a first path 62, denoted $P^*_t$, with a minimum arrival time $AT(P^*_t)$ is identified, e.g., from the search graph 69. At this stage, the search graph 69 may include all or a relevant part of the network graph 60, together with connections to the origin and destination. The first path 62, may be returned to the user, together with the associated total toll cost $TC(P^*_t)$ and number of toll crossings $C(P^*_t)$. If several paths with the same arrival time $AT(P^*_t)$ exist, the one with the minimum total toll cost or minimum number of toll crossings may be returned. In one embodiment, the one with the minimum total toll cost is returned, unless there are several such paths, then any that has the minimum number of toll crossings is returned. The returned path is then a path that minimizes the three criteria (AT(P); TC(P); C(P)), e.g., in this lexicographical order.

In the exemplary embodiment, this includes computing a minimum arrival time path such that the toll cost is minimized as a second criteria and the number of crossing as a third. That is, the best path for the lexicographical ordering (AT(P); TC(P); C(P)) of the three criteria is identified. For this, any classical shortest path labeling algorithm can be used where the arrival_time(P) (or journey time) is minimized. Each path P is given a path label 80, 82, 84, denoted $l_p$=(arrival_time toll_cost, crossings, ...). The path labels are then compared, first according to the arrival time/duration, with the two other criteria being used to break ties one after the other. In this setting, the label of a path will include the three values (arrival_time; toll_cost; crossings) instead of the arrival_time only and the complete order of the path labels is defined by the following:

If label $l_1$=(arrival_time$_1$, toll_cost$_1$, crossings$_1$, ...)
and label $l_2$=(arrival_time$_2$, toll_cost$_2$, crossings$_2$, ...),
then $l_1 < l_2$ if and only if:
arrival_time$_1$<arrival_time$_2$, or
arrival_time$_1$=arrival_time$_2$ and toll_cost$_1$<toll_cost$_2$, or
arrival_time$_1$=arrival_time$_2$, toll_cost$_1$=toll_cost$_2$, and crossings$_1$<crossings$_2$.

Once the fastest (shortest duration) path 62 is obtained, then at S112, the user can define a bound on the arrival time max_arr_time (or simply maxAT), setting it to any time after the minimum arrival time.

At S108, the second path 64 can be computed. The second path is the fastest path from the origin to the destination, through the road network, which uses no tollbooths.

Given the provided information, the user is invited to specify additional constraints 68 at S112. Those constraints may include:

1) The maximum arrival time maxAT before which the user is willing to arrive (which is necessarily after the arrival time $AT(P^*_t)$).

2) The maximum number of times that the user is willing to cross a tollbooth (maximum number of toll crossings) maxC.

3) The maximal total toll cost maxTC, that can only be lower than $TC(P^*_t)$.

If the user does not define a maximum arrival time, the maximum arrival time may be considered as the duration of the fastest path without any toll crossings. If the user does not define a maximum number of toll crossings, either no bound is set on the number or a default limit is used. If the user does not define a maximal total toll cost, the maximal total toll cost may be set as $TC(P^*_t)$, or other default value.

In order to model the toll costs a model 86 of the road network is generated. The model includes a simplified model of the physical road network, which may be generated as a network graph 60, as illustrated in FIG. 4. The network graph 60 may be generated offline and stored for future use, or generated as needed. The network graph 60 includes a toll road network (or networks) 90, representing toll roads in the physical road network. Entry tollbooths (where no fee is paid, but the user may receive a ticket), and exit tollbooths (where a fee is paid, e.g., based on the ticket received at a respective prior entry tollbooth on the toll road), as well as standalone tollbooths (where a fee is paid, which may be independent of any ticket), are represented on the toll road network 90 by nodes 92, 94, 96, 98, etc., connected by edges 100, 102, 104, etc. Toll costs 106, 108 are assigned to the edges 100, 102, of the toll road network 90 part of the graph 60 that connect entry and exit nodes representing geographically spaced tollbooths of the toll road. Toll costs 110 are also assigned to null-duration edges 104 connecting entry and exit nodes on the road network, where on the actual toll road, a user pays a fee simply for crossing the standalone tollbooth, such as a fixed fee. In FIG. 4, entry nodes on the toll network 90 are shown as solid circles, exit nodes as open circles, toll road edges as solid lines, and toll free ways as dashed lines. As will be appreciated FIG. 4 shows only a small portion of a typical network graph 60.

The toll road network 90 thus is a representation of all roads in the physical road network where tolls apply and that can only be accessed by crossing an entry tollbooth and left by crossing an exit tollbooth. Entry-exit pairs are defined as those pairs of locations where the exit location can be reached from the entry location without leaving the toll road network. For each such a pair, a respective toll road edge 100, 102, 104, etc. is defined in the simplified network graph 60, whose duration is the minimum duration of a path in the toll road network between the tollbooth(s) considered and whose toll cost is that associated with the entry-exit pair of nodes. In the network graph 60 of the road network, the standalone tollbooths for which the entry and exit are identical in the physical road network, are modeled as an entry node 96 and an exit node 98 separated by a null duration edge 104. The toll cost 110 associated with the edge 104 is thus that of crossing the single tollbooth.

For toll road networks where it is possible to take a ticket at a first entry tollbooth, pay for the ticket at as second tollbooth, pick up a second ticket at a third toll booth and then leave the toll network by a fourth exit tollbooth and pay the fee corresponding to the second ticket (for example when moving between states or countries), the network graph 60 can include two edges, with the (often short) section of the tollway between the second and third tollbooths being considered as a non-tollway arc. This idea can be extended in the case where more than one pair of such intermediate tollbooths can occur in the toll network.

In the network graph 60, the connected components of the toll road network(s) 90 are separated by non-toll road edges (arcs) 112, 114, etc., from the toll free part of the road network (shown as dashed lines in FIG. 4). In addition, those connected components can have cycles and be of limited size.

The system 10 receives and stores toll data 120 (FIG. 1) that provides the prices for every possible pair of entry and exit tollbooths that are connected by a path in the toll road network, and prices for standalone tollbooths.

The travel times for each edge 100, 102 representing a connected entry and exit in the toll way network, are computed by considering only toll roads which, singly or in combination, form a path between the entry and exit. Similarly, for computing travel times of non-toll road edges 112, 114, etc., between every exit and entry, only non-toll roads, which, singly or in combination, form a path between the exit and entry are considered, such that the duration of the respective edge is minimized. A tollbooth crossing delay can be added to the model 86 in order to integrate the time spend queuing and paying. The same crossing time penalty can be added to all exit-entry edges 100, 102, etc., or a specific value may be defined and added for each edge.

In order to make the computations more efficient during the search (S116), all the edge durations may be precomputed and stored in the model 86 of the road network.

An illustrative search graph 69 is shown in FIG. 6. In the graph 69, as in the network graph 60, toll road entry tollbooths, exit tollbooths and standalone tollbooths are represented by nodes of the graph, the nodes being connected by edges. In graph 69, only nodes and edges which are able to form paths between the origin and destination need to be included. At least one of the entry nodes is connected by an edge to the origin, while other entry nodes may be connected to a prior toll road exit node on a path. Similarly, at least one of the exit nodes is connected by an edge to the destination, while other exit nodes may be connected to a subsequent entry node on a path. Each entry and exit node is initially associated with an arrival time label 121, which indicates a minimum arrival time and a maximum arrival time. The minimum arrival time is computed from the time the user has selected as the start time, or from 0:00, by summing the durations (e.g., in minutes) associated with the edges connecting the node to the origin. The maximum arrival time of a node is computed backwards from the destination, which has a label for the maximum arrival time. As will be appreciated, candidate paths that traverse the search graph between the origin and destination may share some of their edges.

Figure 5:
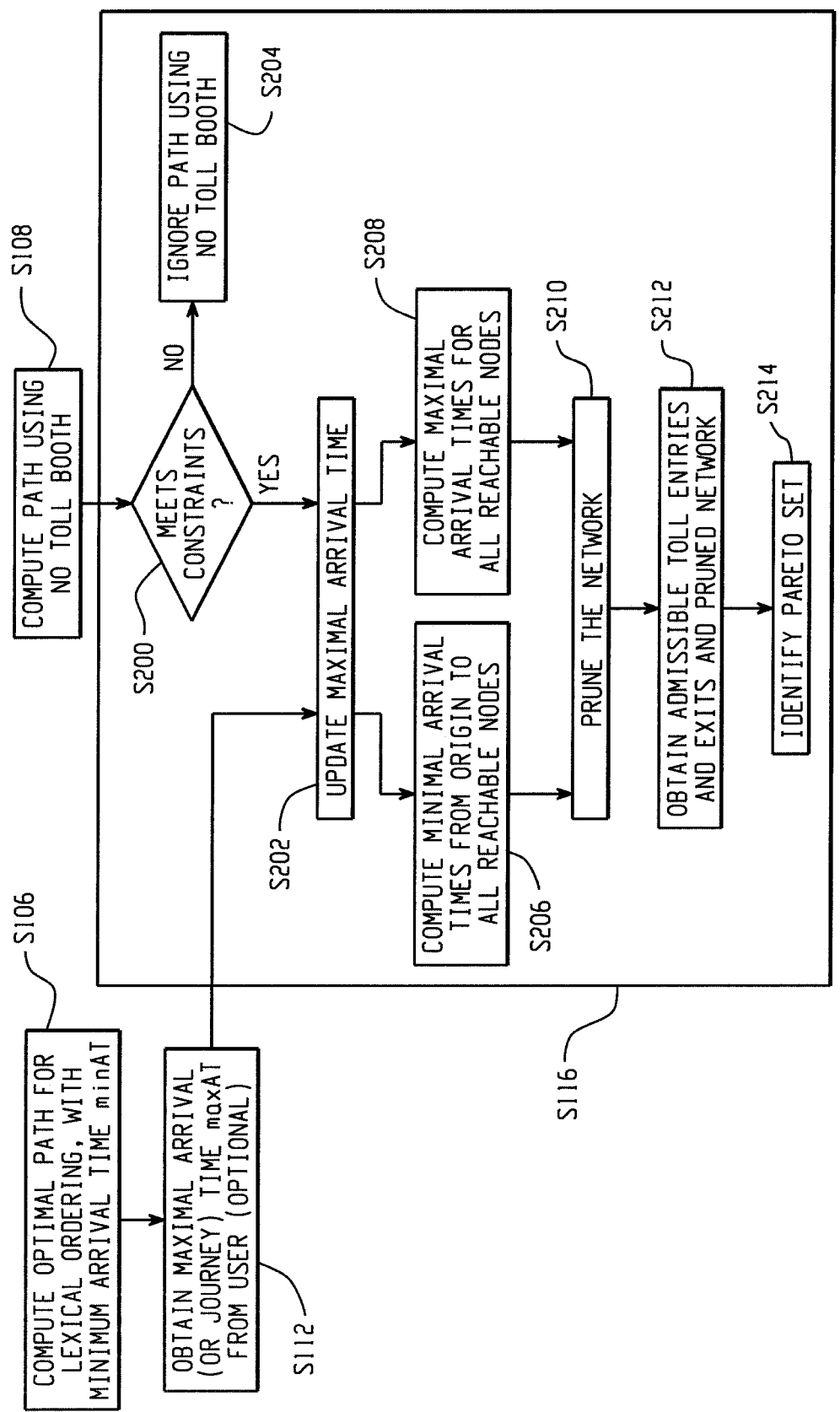
FIG. 5 is a flow chart illustrating a method of identifying an initial set of candidate paths between an origin and a destination in the method of FIG. 2.

Given the constraints 68, at S116, the system computes all the Pareto solutions for the criteria: maximum arrival time, maximum toll cost, and maximum toll crossings. An example method is illustrated in FIG. 5.

From the initialization steps S106, S108 the first (shortest duration) path 62, between the origin and destination, with a minimum arrival time, and the second path 64, using no tollbooths, are both known. Path 62 is automatically admissible, since no other path in the Pareto optimal set can have a shorter path time, and paths that are of equal path time are dominated on one or both of the other criteria.

If at S200, the second path 64 is admissible (meets the constraints set at S114), it is added to the set 12 of Pareto optimal solutions. Since this path 64 does not use any tollways, its toll cost and its number of crossings are both null. By definition, therefore, path 64 is Pareto optimal, if it meets the constraint on arrival time, when the constraints considered are duration, toll cost, and toll crossings. If at S200, this path meets the constraint on arrival time, the max_arr_time can also be updated with the arrival time of path 64 (S202). Otherwise, the second path 64 can be ignored (S204) and max_arr_time is that set by the user.

In order to prune the search space, the shortest duration from the origin to all nodes in the search graph 69 is computed and those which do not meet the time constraint may be removed (S206). This may include identifying the (shortest-duration or all) sub-paths from the origin to all nodes (vertices) in the network graph 60 that can be reached within the bound max_arr_time. Nodes that have been reached can be retained in the reduced search graph 70. This defines, for all reachable nodes, a minimum travel time from the origin that is used to define visit time intervals.

Then at S208, a backward propagation is performed from the destination towards the origin. This employs the same computation as S206, but backward from the destination. Starting from the destination t, the search graph 69 is traveled using at each node v the sub-paths (arcs, edges) arriving at v instead of the ones leaving v.

If a vertex v is reached after a duration (Pv;t) from the destination, and if arrival_time (Ps;v)+duration(Pv;t)>max_arr_time, the node can be pruned (S210), since no path between s and t using this node can respect the user's maximal arrival time bound. In addition, this enables defining a maximum arrival time at each node (that has not yet been pruned), which respects the time constraint at the destination. The difference between the maximum arrival time at t and the minimum arrival time at t when passing by v gives the duration of the arrival time interval at v. Then, for every node, the time interval can be stored and used to reduce the search space when computing paths using the search graph 69.

For example, consider the search graph 69 shown in FIG. 6, which could be generated at S206 from the network graph 60. The user has selected to leave the origin s at 8:00 and set a maximum arrival time for reaching the destination t of 9:10. The fastest path(s) between s and t, via nodes 122, 124, 126, 128, or via nodes 132, 134, is 50 minutes long, so the minimum arrival time at t is 8:50. The set of nodes which can be reached from s, via one or more sub-paths, within the max_arr_time, are identified. These include initial nodes 122, 132, 136, 140, 144, which are each connected to the origin by a single arc, as well as other nodes, such as nodes

Figure 7:
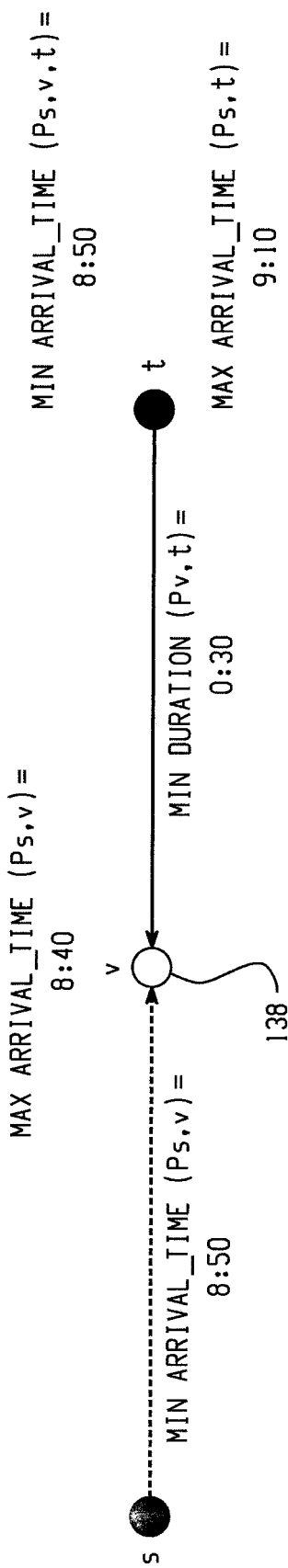
FIG. 7 illustrates computation of minimum and maximum arrival times at a node of the search graph.

124, 126, 128, 134, 138, 140, 142, 146. The minimum arrival time at each of these nodes, from the origin is identified by summing the journey times of their sub-paths. Then, in S208, the maximum arrival time at some or all of these nodes is computed, by subtracting the sub-path journey times from the maximum arrival time at the destination. For example, as illustrated in FIG. 7, for node 138, the minimum journey time from the destination (min duration (Pv,t)) is 30 minutes, so the maximum arrival time at that node from the origin (max_arrival_time (Ps,v)) is 9:10−0:30=8:40, i.e., the latest time that node 138 can be reached and still complete the journey to the destination by the maximum arrival time max_arr_time of 9:10. Since the maximum arrival time at node 138 from t is less than the minimum arrival time from s, node 138 is pruned, since it cannot be used to reach the destination within the maximum arrival time. As a result of the pruning, nodes 136, 138, and 146 are pruned from the graph, and also the sub-paths directly connected to them. In FIG. 6, for example, the sub-paths 150, 152, 156, 158 can be removed, resulting in a reduction in the number of the possible nodes/paths that need to be considered as potential Pareto optimal solutions. In a similar way, the graph can be pruned to remove nodes which do not meet the other constraints-maximum number of toll crossings and maximum toll cost.

Figure 8:
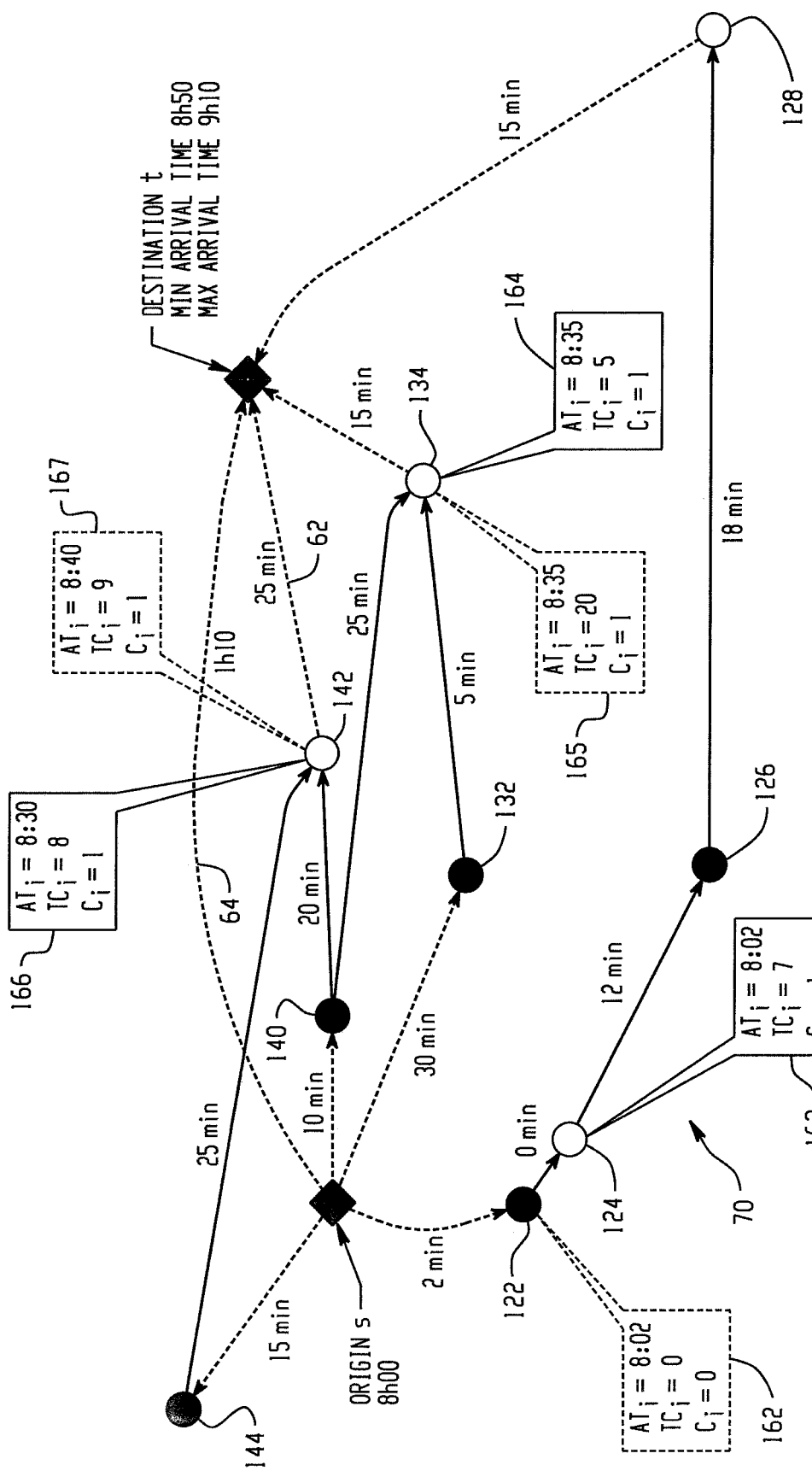
FIG. 8 illustrates labeling of nodes remaining after pruning in the search graph.

At S212, a pruned search graph 70 is generated, as illustrated in FIG. 8, for the case of FIG. 6. Traversing the pruned graph 70 would yield a set of candidate paths which meet one or more, or all of the constraints, but which are not necessarily Pareto optimal. It is not necessary to enumerate all the possible paths in the exemplary embodiment, only those which meet all the constraints and which are Pareto optimal. Some or all of the nodes in the pruned network graph 70 may be associated with a respective set of node labels, shown in FIG. 8 as labels 162, 163, 164, 165, 166, 167, etc. Each node label includes, for that node i, a value for each of the criteria, which in the exemplary embodiment are: the computed arrival time from the origin s ($AT_i$), the total toll cost ($TC_i$), up to that node, and the total number of crossings ($C_i$), up to that node, for a respective path to that node from the origin. The node labels may be generated iteratively, as described below. While labels are illustrated in FIG. 8 only for nodes 122, 124, 128, 132, 134, 142, the other nodes may also receive respective labels.

From the pruned network graph 70, a list 168 (FIG. 1) may be generated, which includes all the possible toll road network entry nodes that can be reached from the origin s (nodes 122, 126, 132, 140, 144, in FIG. 8) and all the toll road exit nodes (nodes 124, 128, 134, and 142) that can be used to reach the destination t, while respecting the constraints, with a maximum arrival time at each node (S212). As can be seen, in the case of FIG. 8, for entry node 122, the next exit node 124 corresponds to the same standalone tollbooth.

At S214, a Pareto set 12 is built. The initial set of solutions in the Pareto set includes only the optimal path 62 computed for the lexicographical ordering (arrival_time(P), toll_cost (P), crossings(P)) and the earliest arrival time path 64 using no toll roads, if it is admissible (meets the constraints). To this set, additional solutions are added from the pruned network 70.

Figure 9:
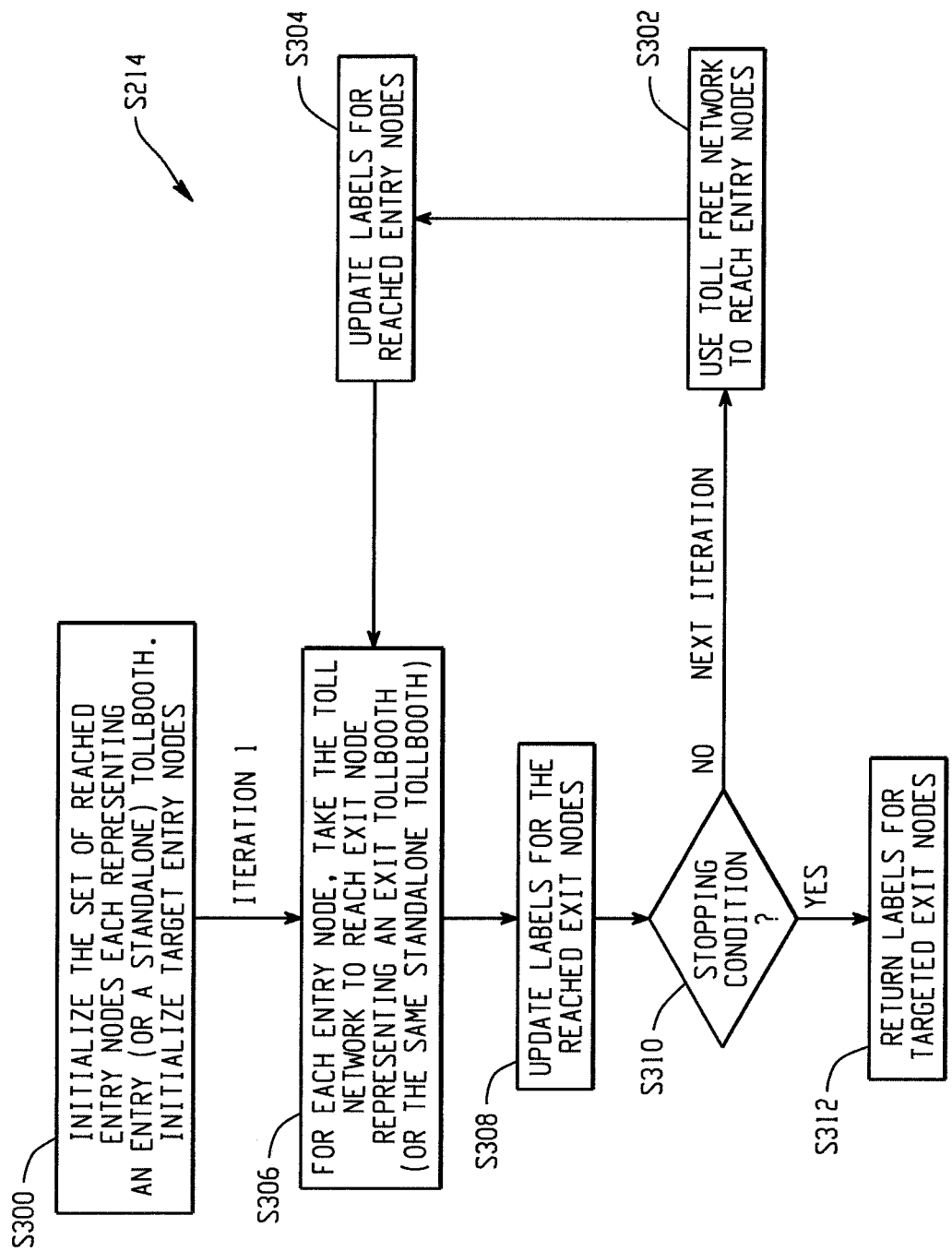
FIG. 9 is a flow chart of an example method for identifying a Pareto set of paths in the method of FIG. 2.

From the initialization step S212, all the entering nodes in the toll road network reachable from origin s that can be used to build at least a path from the origin to the destination that will respect the time constraint are known. These are the tollbooth entering nodes reachable from the origin s in the pruned network (nodes 122, 126, 132, 140, 142 in the FIG. 8 example). In the same way, the set of the exit nodes of the toll road network that can reach the destination t, and a maximal arrival time to do so at each considered exit node are known (nodes 124, 128, 134 and 142 in FIG. 8). While complete enumeration of the admissible paths between origin and destination in the pruned search graph may be considered in turn to identify the Pareto set, the number of nodes in the pruned network graph 70 is generally larger than that illustrated in FIG. 8, and the number of such paths is generally exponential of the graph size. A more structured analysis can thus be used, as illustrated in FIG. 9, to compute the Pareto set for the three criteria: arrival_time(P), toll_cost (P), crossings(P) of paths, respecting the constraints set for each criterion, i.e., not exceeding the upper and/or lower bound(s) set for each criterion.

At S300, a first set of reached nodes is initialized with the initial nodes 122, 132, 140, 144 and their durations from the origin s. A set of target nodes is defined as the exit nodes 128, 134, 142, corresponding to the exit nodes that can reach destination t in the pruned search graph and their duration to the destination t.

The method may proceed through one or more iterations. At each iteration, it is assumed that the driver passes by exactly one exit node where payment is made. The exit node may correspond to a next exit tollbooth or be the exit node of an already reached stand-alone tollbooth (which is treated as an entry and an exit nodes). To reach this node (tollbooth) from the current set of reached nodes, the driver can use first a toll-free road network, except in a first iteration, and then enter the toll road network to reach an exit node (tollbooth) and make payment (S302). For each subsequent reached entry node, the set of candidate node labels obtained from the previous iteration is updated (S304). In particular, the set of non-dominated labels of each node is updated (by adding and/or removing node labels in the set). The removed node labels correspond to the paths found at the previous iteration, which were, in the prior iteration, non-dominated in the Pareto sense but which are now dominated.

For each reached entry node and for each label of this node, updates are made to the set of labels of all the successor nodes by adding the edge duration and toll cost to the respective label (S306). To be saved, the new node label must respect the constraints on the toll cost and the arrival time interval. In addition, it must not be dominated by any of the current labels at the exit node. If, on the other hand, the new label dominates any of the current labels, the dominated label will be removed from the set for that node. It should be noted that labels from previous iterations cannot be dominated, since their number of toll crossings is strictly lower than that of the labels of the current iteration. At the end of the iteration, all the non-dominated exit node labels found during the iteration are used to initialize the reached nodes (S308). If at S310, a stopping condition is reached, the method proceeds to S312, where labels for the target exit nodes are returned. Otherwise, the method proceeds to S302 for a next iteration.

As an example, consider the graph in FIG. 8. In a first iteration, at S300, the tollbooth nodes 122, 140, 144, and 132 are initialized with paths: 1 (duration 2 mins), 2 (duration 10 mins), 3 (duration 15 mins), and 4 (duration 30 mins), respectively. They each have a respective label which includes values for the computed arrival time (from the origin), toll cost, and toll crossings, up to and including that node ($AT_i$, $TC_i$, and $C_i$) using one of the paths through the search graph 70. At S306, the toll network part of the graph is used to reach the respective exit tollbooth nodes 124, 134, 142. At S308, the labels for each of the reached tollbooth nodes 124, 134, 142 are updated. Thus, for tollbooth node 142, two labels 166, 167 are considered. Label 166 corresponds to a path via node 140 and label 167 corresponds to a path via node 144. Since label 167 is dominated by label 166 (label 166 is strictly better on two of the three criteria $AT_i$, $TC_i$, and equal on the third $C_i$), label 167 is pruned. A comparison is also made with the labels of the other reached exit nodes 124, 134. In the case of node 142, there are no successive entry nodes to be updated and pruned since the successive node is the destination (the destination node is updated as described below). In the next iteration, only the path which includes exit node 124 can be extended.

The algorithm illustrated in FIG. 9 is not polynomial since the number of labels of some nodes could, in theory, grow exponentially. See Pierre Hansen, "Bicriterion path problems," In Günter Fandel and Tomas Gal, editors, Multiple Criteria Decision Making Theory and Application—Proc. Third Conference Hagen/Königswinter, West Germany, Aug. 20-24, 1979, volume 177 of Lecture Notes in Economics and Mathematical Systems, pp. 109-127. Springer Berlin Heidelberg, 1980. However, it can be made very efficient, in practice, for the exemplary method. In the exemplary method, this is achieved by finding all the non-dominated labels with no toll crossings, then finding those with one crossing allowed, and so on. Hence, for a given node, at iteration k, where k is the number of toll crossings that are allowed, a node label 162, 164, 166 cannot dominate any of the labels previously found for 0, 1, . . . , k-1. Some nodes may have two or more labels, depending on the different paths which can be used to reach them. For example, node 142 in FIG. 8 may have a first label 166 corresponding to a path from the origin to node 142 via node 140 and a second label 167 corresponding to a path from the origin to node 142 via node 144.

As will be appreciated, a node label obtained at iteration k can be dominated by node labels from the previous iterations. In order to make the propagation faster, the out neighbors of a given node i can be sorted in increasing order of $max\_arr\_time_j - duration_{i,j}$. In that case, the search for a node label can be pruned (discontinued) when the first neighbor with $max\_arr\_time_j - duration_{i,j} > AT_i$, where $AT_i$ is the arrival time at i in the current label.

For example, in FIG. 8, the outgoing neighbors of node 140 are nodes 142 and 134. For nodes 142 and 134, the $max\_arr\_time_j - duration_{i,j}$ equals 8:25 and 8:50, respectively, so the order is node 142, node 134. The arrival time $AT_1$ at node 140 is 8:10, so pruning is discontinued.

In order to make the evaluation of node labels faster, the non-dominated node labels may be sorted by increasing arrival times. Then, each new node label is evaluated in turn and inserted in the list, if it is not dominated, stopping when a dominated node label is reached. Thus, if a label $(AT_i, TC_i)$ could be inserted between $(AT_i^k, TC_i^k)$ and $(AT_i^{k+1}, TC_i^{k+1})$ in the list, it is not dominated if and only if $TC_i < TC_i^k$. In this way, blocks of labels can be defined by a minimum arrival time $(AT_i^k)$, a maximum arrival time $(AT_i^{k+1})$ and a maximal cost $TC_i^k$, below which the label is not dominated. In this approach, a list of blocks is maintained, independently of the number of toll crossings. Hence, the blocks are not defined by the whole set of non-dominated labels, but by the set of Pareto solutions for fewer than all of the criteria, e.g., for the criteria, arrival_time and toll_cost only. This is similar to the approach described in Nora Touati Moungla, "An improving dynamic programming algorithm to solve the shortest path problem with time windows," Electronic Notes in Discrete Mathematics, 36:931-938, 2010.

When checking the pertinence of a new label for a node, there are two possibilities:

1. The new node label belongs to a block: it is non-dominated. The blocks are updated (as in Moungla) and all labels for the current number of toll crossings that are dominated are removed (those with a lower crossing number cannot be dominated).

2. The new node label does not belong to a block: it is dominated.

Figure 10:
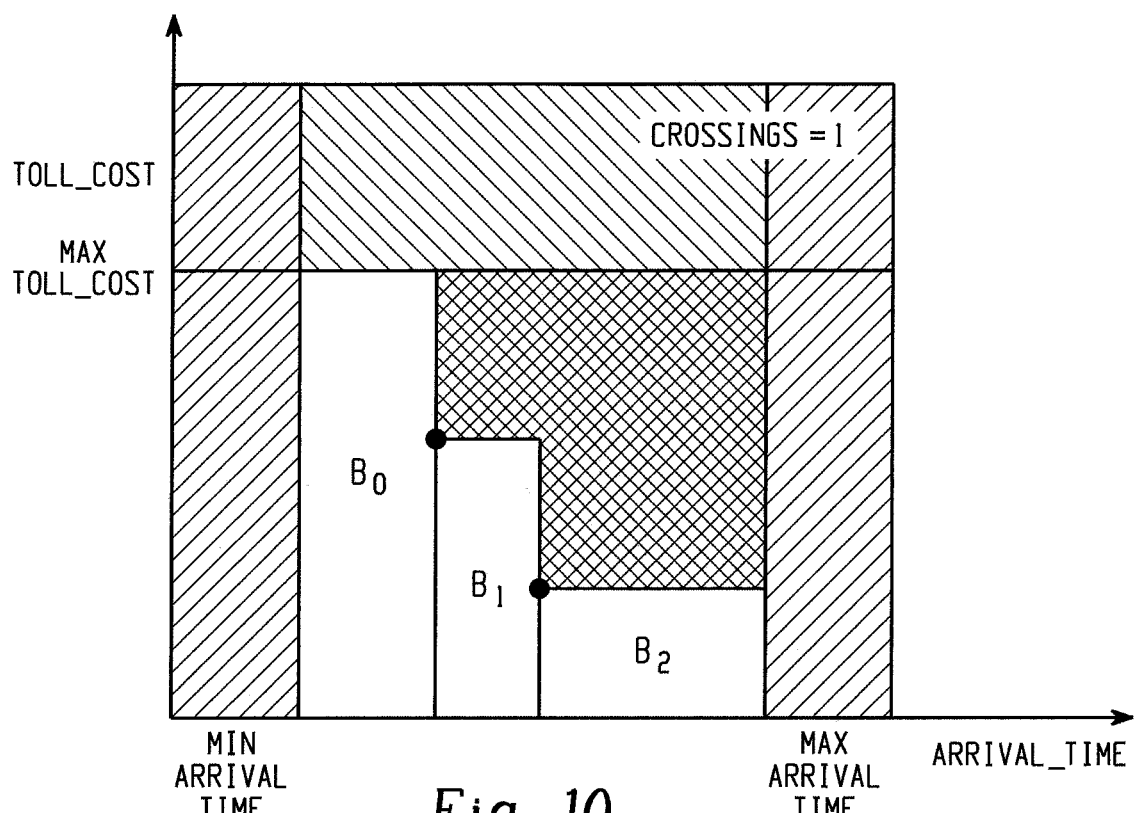
FIGS. 10 and 11 illustrate the effect of adding labels to a set of non-dominated labels of a node with two crossings and updating the blocks.
Figure 11:
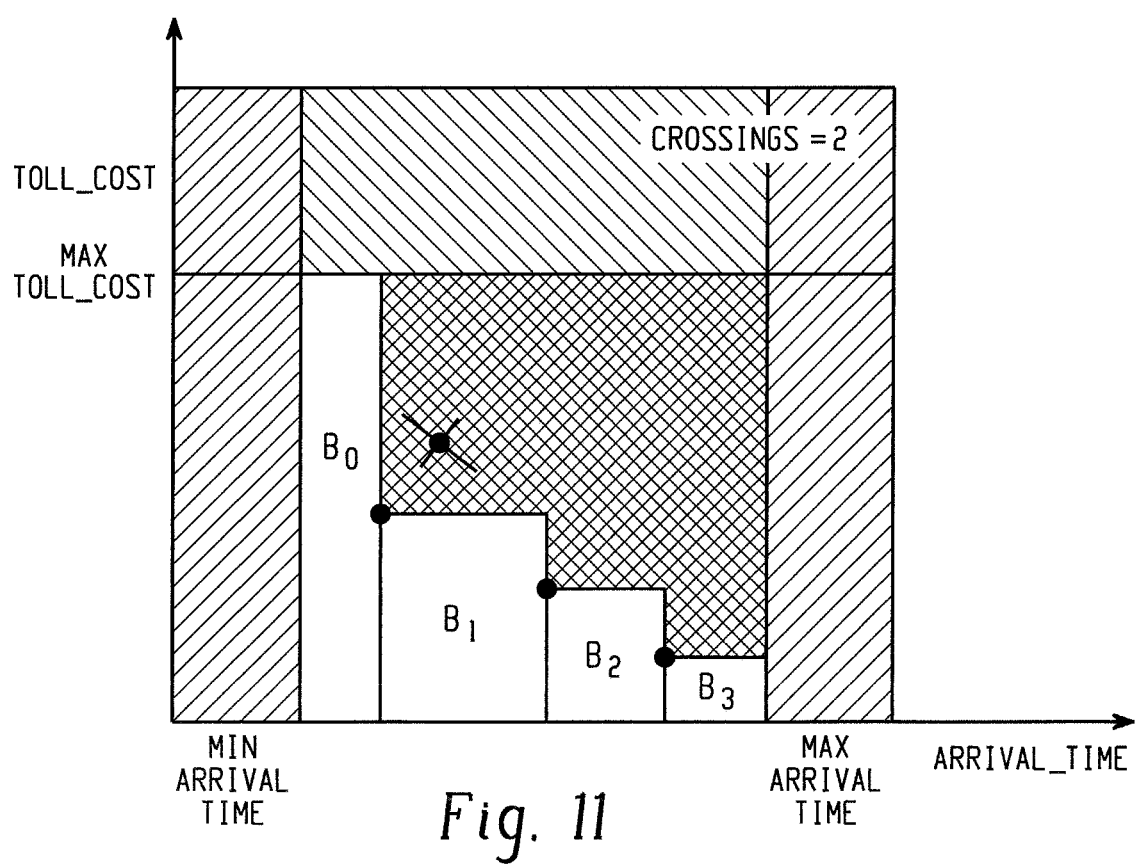

As an example, FIGS. 10 and 11 illustrate Pareto fronts for minimum arrival time and minimum toll cost, where the constraints on maximum toll cost and maximum arrival time are the same, but the toll crossings differ (in FIG. 10 crossings=1, in FIG. 11, crossings=2). The Pareto front is the representation of the values of the Pareto optimal solutions in the criteria space. In FIG. 10, two Pareto optimal criteria values are identified which meet the constraints, one better for cost, the other better for arrival time. With an additional toll crossing permitted (FIG. 11), three solutions are identified, only one of which being in the set for FIG. 10.

Nodes can have one, two, or more (arrival time, toll cost, and number of toll crossings) labels. FIGS. 10 and 11 illustrate how to compute the dominated label quickly, when presented with a new label. In the iterative algorithm, only one more toll crossing is allowed at each step, but arrival time and toll cost are still to be optimized at a given step. During the search, labels such that the toll cost is above the bound or the actual arrival time is higher than the maximum arrival time for the node can also be discarded. The admissible region for those values in the labels is shown in FIGS. 10 and 11.

For each node and each current maximum number of toll crossings, there is a set of labels (represented by the blocks) that is the set of non-dominated labels for that step with only two of the criteria (arrival time and toll cost). Saving the blocks of all iterations for all the reached nodes enables retrieving the Pareto set for those nodes and hence to infer the Pareto set for the final destination. The Pareto set for the final destination in the road network can thus be computed directly from the labels of the destination node in the reduced search graph.

The algorithm illustrated in FIG. 9 stops (S310) when a stopping criterion is reached, e.g., when a maximum number of iterations has been reached or no new toll road network node has been reached at the last iteration.

At S116, one or more solutions (candidate paths) in the Pareto set is made available to the user. In the case where the Pareto set contains only a few solutions, they can all be listed and displayed to the user. However, if the Pareto set contains many solutions, which may be the case for long distance journeys, only a subset of the Pareto set 12 may be provided to the user, at least as a first instance. To select this subset, different strategies can be applied. For example, the solutions may be sorted according to the user's preferences or according to any predefined ordering and only the k top solutions are returned. The solutions may also be selected on certain characteristics, for example, returning all the solutions that increase the number of toll crossings by less than k, compared to the fastest path found during the initialization.

Once the set of solutions to be returned to the user has been chosen, it can be displayed to the user on a map 18 and/or in a sorted list stating the objective values of the path for each criterion. If a sorting has been used to determine the returned solution set, then the same sorting can be used for display.

The exemplary system and method compute and display possible itineraries (that correspond to Pareto optimal solutions) for the user to choose from that use or do not use the toll road network, going from an origin to a destination. The itineraries are generated in such way what they propose different optimal trade-offs between arrival time, toll cost, and the number of tollbooths crossed. This path set is then displayed on a map, and the different characteristics of the paths (including duration, toll cost and number of tollbooths crossed) are listed in order for the user to be able to make an informed choice.

In the exemplary method, the Pareto set includes alternative paths, which may include those in which the driver will leave the tollway to reenter it later, if it leads to a better solution. In addition, the user does not have to plan the route in advance but can allow the system to compute a set of the best candidate paths from the origin to the destination, given the user's constraints.

The method illustrated in FIGS. 2, 5 and/or 9 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2, 5 and/or 9, can be used to implement the method.

The steps of the method need not all proceed in the order illustrated and fewer, more, or different steps may be performed.

As will be appreciated, while the steps of the method may all be computer implemented, in some embodiments, one or more of the steps may be at least partially performed manually. However, in the exemplary embodiment, at least some of the steps are computer-implemented. In particular, in order to identify candidate paths which are Pareto optimal, assuming a set of at least 10 possible paths, or at least 20 possible paths, or at least 50 possible paths, and/or from a graph which includes at least 20, or at least 30, or at least 50 nodes, in a time frame which is useful to a user, such as in 10 seconds or less, such as 5 seconds or less, or 1 second or less, some or all of steps S106, S108, and S116 are computer implemented.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for identifying candidate paths between an origin and a destination, comprising:
    establishing a constraint for each of a plurality of criteria, based on input from a user;
    computing a set of Pareto optimal candidate paths from the origin to the destination, which respect the constraints on the criteria and which are all Pareto optimal;
    displaying at least a subset of the Pareto optimal candidate paths to the user,
    wherein at least one of establishing constraints, computing the set of Pareto optimal candidate paths, and displaying at least a subset of the Pareto optimal candidate paths is performed with a processor.

2. The method of claim 1, wherein the method further includes receiving a selection of one of the Pareto optimal candidate paths from the user and generating routing instructions for the selected Pareto optimal candidate path.

3. The method of claim 1, wherein the criteria include at least three criteria.

4. The method of claim 1, wherein the criteria comprise:
    a total duration of the candidate path;
    a total toll cost for the candidate path; and
    a total number of toll crossings for the candidate path.

5. The method of claim 1, further comprising:
    providing an interface which enables the user to set a constraint on at least one of the criteria.

6. The method of claim 1, wherein the computing of the set of Pareto optimal candidate paths comprises:
    pruning a search graph representing the road network between the origin and destination to remove nodes which are not able to form paths between the origin and the destination which respect at least one of the constraints on the criteria; and
    from the pruned graph, identifying candidate paths which are Pareto optimal.

7. The method of claim 1, wherein the identifying of the set of Pareto optimal candidate paths comprises:
    generating a search graph representing the road network from the origin to the destination in which entry, exit, and standalone tollbooths, where present, on toll roads of the road network are represented by nodes of the graph which are connected by edges, wherein each entry tollbooth is represented by an entry node, each exit tollbooth is represented by an exit node, and each standalone tollbooth is represented by an entry node and an exit node, pairs of entry and exit nodes being connected by edges, each edge being associated with a respective duration, and wherein each edge connecting an entry and an exit node representing a standalone tollbooth is associated with a null duration, at least one of the entry nodes, where present, being directly connected by an edge to a node representing the origin and at least one of the exit nodes, where present, being directly connected by an edge to a node representing the destination.

8. The method of claim 7, wherein the identifying of Pareto optimal candidate paths comprises pruning the search graph to remove nodes and edges for which no path between the origin and destination which includes those nodes and edges could be identified which meets at least one of the constraints set for the criteria.

9. The method of claim 8, wherein the pruning comprises, for at least one node in the graph:
computing a minimum arrival time at the node from the origin;
computing a maximum arrival time at the node, based on a maximum arrival time at the destination; and
where the minimum arrival time exceeds the maximum arrival time, pruning the node and directly associated edges from the graph.

10. The method of claim 1, wherein the computing of the set of Pareto optimal candidate paths comprises:
iteratively, for a set of paths from the origin that are not necessarily Pareto optimal, until a stopping criterion is reached:
advancing each path to a next entry node representing a first tollbooth;
advancing each path from the respective reached entry node to a next exit node representing a second tollbooth, or the first tollbooth, when the first tollbooth is a standalone tollbooth;
updating labels for the reached exit nodes, including removing labels for the reached exit nodes that are dominated by at least one other updated label for the respective reached exit nodes; and
when the stopping criterion is reached, outputting remaining candidate paths as Pareto optimal candidate paths.

11. The method of claim 1, further comprising receiving information identifying the origin and destination from the user.

12. The method of claim 1, further comprising identifying at least one of:
identifying a first path between the origin and destination, which is the path with a shortest predicted duration of a set of possible paths considered; and
identifying a second path between the origin and destination, which is the path with the shortest predicted duration of the set of possible paths considered that exclude toll roads.

13. The method of claim 12, wherein the computing of the set of Pareto optimal candidate paths comprises:
initializing the set of Pareto optimal candidate paths with at least one of the first and second paths provided that the constraints for the criteria are met; and
iteratively extending candidate paths from the origin to the destination by one toll crossing, and at each iteration, removing paths that are dominated by other paths.

14. A computer program product comprising a non-transitory recording medium storing instructions, which when executed on a computer, cause the computer to perform the method of claim 1.

15. A system comprising memory which stores instructions for performing the method of claim 1 and a processor in communicating with the memory which executes the instructions.

16. A system for identifying candidate paths between an origin and a destination, comprising:
memory which stores a network graph in which toll road entries and exits and toll crossings are represented by nodes of the graph, the nodes being connected by edges, each edge being associated with a respective duration;
a criteria setting component which establishes a constraint for each of a plurality of criteria, based on input from a user;
a candidate path computation component for computing a set of Pareto optimal candidate paths from the origin to the destination based on the network graph, which respect the constraints on the criteria and which are all Pareto optimal;
a display component for causing at least a subset of the Pareto optimal candidate paths to be displayed to the user; and
a processor which implements the criteria setting component, the candidate path computation component and display component.

17. The system of claim 16, further comprising a graphing component which generates a search graph from the network graph, the search graph representing possible paths from the origin to the destination, wherein each toll road entry is connected to the origin or to a prior toll road exit by an edge, each toll road exit is connected to the destination or to a subsequent toll road entry by an edge, and each toll crossing that is intermediate a toll road entry and a toll road exit is represented by an entry node and an exit node.

18. The system of claim 16, further comprising a fastest path computation component which computes a first path of shortest duration between the origin and destination, the criteria setting component providing for the user to select a constraint on a total duration of a candidate path which is at least as long as the first path.

19. A method for identifying candidate paths between an origin and a destination, comprising:
receiving information from a user for identifying an origin and a destination in a road network which includes a toll road network;
identifying a shortest duration path from the origin to the destination;
providing for the user to input constraints on three criteria, at least one of the criteria being a maximum duration on a candidate path from the origin to the destination which is at least the duration of the shortest duration path;
generating a set of Pareto optimal candidate paths from the origin to the destination comprising:
providing a search graph representing a part of the road network between the origin and destination, in which toll network entries and exits and intermediate tollbooths between the entries and exits are represented as nodes connected by edges, each edge being associated with a duration;
pruning nodes of the search graph, each of the pruned nodes being a node for which no path from the origin to the destination which contained the node could satisfy the maximum arrival time constraint; and
from the pruned search graph, identifying a set of Pareto optimal candidate paths from the origin to the destination, which respect the constraints on the criteria and which are all Pareto optimal;
displaying at least a subset of the Pareto optimal candidate paths to the user, wherein at least one of generating a candidate set of paths, generating a candidate set of paths, and displaying at least a subset of the candidate paths is performed with a processor.

20. The method of claim 19, further comprising identifying a second path between the origin and destination which does not use the toll road network and, if the second path respects the constraints on the criteria, adding the second path to the set of candidate paths which respect the constraint on the criteria and which are all Pareto optimal.

* * * * *